July 30, 1968  A. A. DI PILLA  3,394,909
SINGLE AND GANG MOUNTS FOR ELECTRIC CASINGS
Filed July 12, 1966  2 Sheets-Sheet 1

INVENTOR
ANTHONY A. DI PILLA

BY *Anthony A. O'Brien*
ATTORNEY

July 30, 1968   A. A. DI PILLA   3,394,909
SINGLE AND GANG MOUNTS FOR ELECTRIC CASINGS
Filed July 12, 1966   2 Sheets-Sheet 2

INVENTOR
ANTHONY A. DI PILLA

BY Anthony A. O'Brien

ATTORNEY

United States Patent Office 3,394,909
Patented July 30, 1968

3,394,909
SINGLE AND GANG MOUNTS FOR ELECTRIC CASINGS
Anthony A. Di Pilla, Philadelphia, Pa., assignor to Robertshaw Controls Company, Richmond, Va., a corporation of Delaware
Filed July 12, 1966, Ser. No. 564,645
12 Claims. (Cl. 248—27)

ABSTRACT OF THE DISCLOSURE

This invention relates to a device for mounting an electrical outlet box in a wall panel. The outlet box being provided with openings in its opposed side walls and flanged members to engage the wall panel. A pair of wire mounting clips interlockingly engage in the openings in the outlet box walls and resiliently engage the back of the wall panel to secure the box in place.

---

This invention relates generally to mounting arrangements for electrical devices, and more particularly, to a versatile, resilient mounting arrangement for electrical modules.

There are several types of mountings for joining electrical modules to an instrument panel or similar supporting structures. One type of mounting is known as flange-mounting, wherein a module is held in position in a panel cutout by means of flanges on the module housing engaging the surface of the panel. A second type of mounting is known as barrier mounting, wherein a plurality of modules are ganged together with a barrier interposed between each pair of modules and suitable fasteners maintain the modules and barriers as a unitary arrangement.

Each module, which is usually rectangular in configuration, can be mounted with its longer pair of opposed sidewalls extending either horizontally or vertically. In view of the four possible manners of mounting such modules, instrument panels have been fabricated with four different sizes of panel cutouts. Therefore, each module was provided with four mounting devices, and one of these four devices was secured thereto in dependence upon the panel cutout within which the module was to be disposed. Obviously, this procedure reqiured a duplication of parts and effort in installing the modules, thereby incurring additional expense.

Accordingly, it is an object of the present invention to construct a simple mounting arrangement for electrical modules that can be utilized for a variety of sizes of panel cutouts.

Another object of the present invention is to construct a versatile mounting arrangement for electrical modules that is suitable for use in mounting either a single module or a plurality of modules in either a horizontal or vertical array.

Another object of the present invention is to provide modules of electrical devices with a versatile mounting arrangement that may be inserted into a panel cutout of any size, and removed therefrom, by manual forces applied from the front of the panel.

Another object of the present invention is to provide modules of electrical devices with a mounting arrangement that may be used to convert conventional rear-mounted modules into front-mounted modules.

In accordance with the present invention, a preferred embodiment of this mounting arrangement includes an electrical device module with a housing including four walls. A pair of spaced slots is located in each wall, and resilient clip means is detachably secured in the slots in a pair of opposed walls for mounting the housing.

Figure 2:
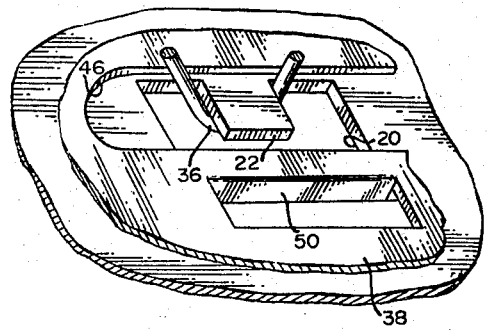
Figure 1:
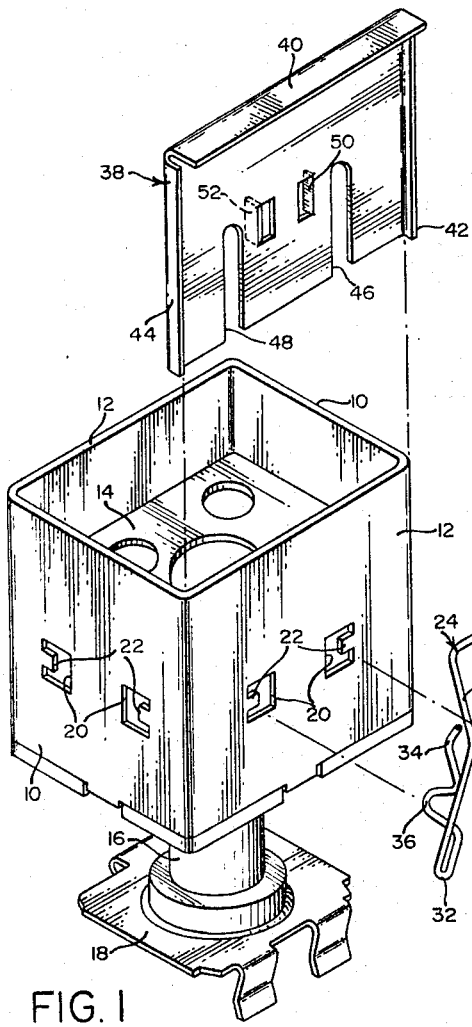
Figure 3:
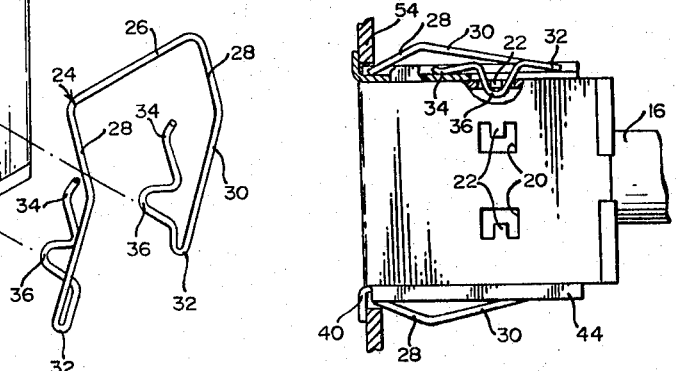
Figure 4:
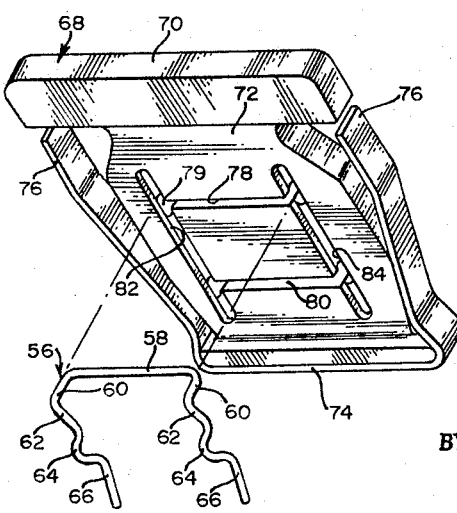
Figure 5:
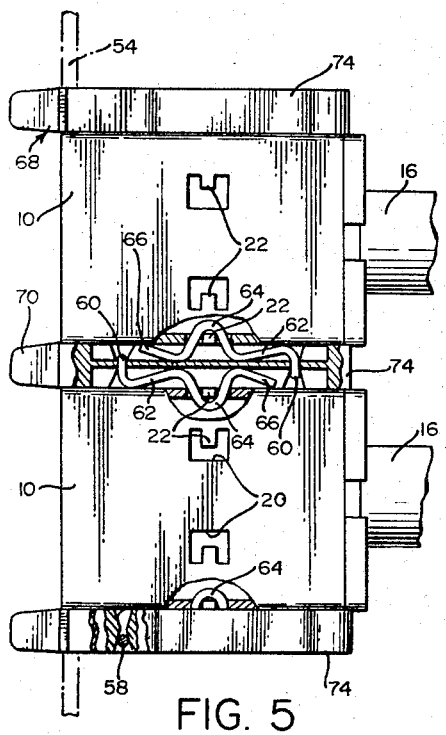
Figure 6:
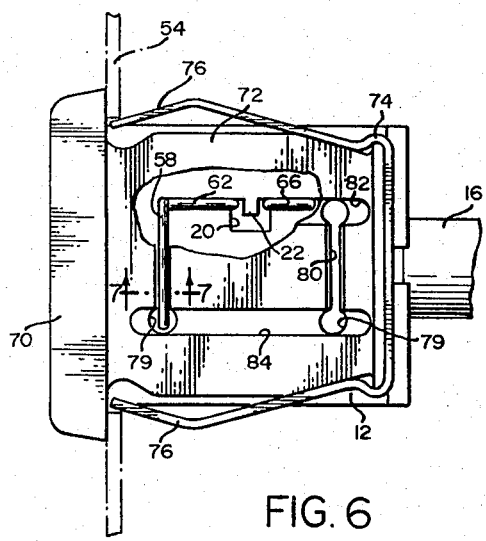
Figure 7:
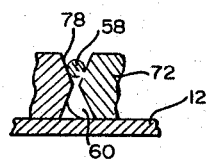
Figure 8:
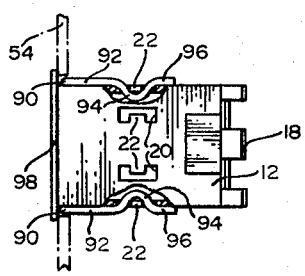
Figure 9:
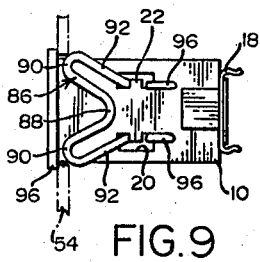

Other objects and advantages of the present invention will become apparent from the following description taken in connection with the accompanying drawings wherein:

FIG. 1 is an exploded perspective view of a module and a flange-mounting arrangement therefor;
FIG. 2 is a partial perspective view of a detail of FIG. 1 with clip means and flange secured thereto;
FIG. 3 is an end view of the module of FIG. 1 with portions cut away to show the mounting arrangement in assembled position;
FIG. 4 is an exploded perspective view of a modification of the mounting arrangement;
FIG. 5 is an end view with parts in section of a pair of ganged modules with the mounting arrangement of FIG. 4;
FIG. 6 is a bottom plan view of FIG. 5;
FIG. 7 is a partial cross section of a detail taken along line 7—7 in FIG. 6;
FIG. 8 is an end view of another modification of a mounting arrangement for modules; and
FIG. 9 is a plan view of FIG. 8.

Referring now to the drawings, FIG. 1 shows a rectangular housing for an electrical device module formed by an opposing pair of short sidewalls 10 and an opposing pair of longer sidewalls 12. An electrical device, such as a push-button actuator unit (not shown) and an indicator bulb mount 14, is inserted into the receptacle defined by sidewalls 10 and 12. An operating plunger assembly 16 extends axially downward from the housing and includes a clamp 18 whereby a switch assembly (not shown) is secured thereto. An identical pair of spaced slots 20 is formed in each of the sidewalls of the housing and each slot has a locking tang 22 extending therein. An integrally formed resilient clip, indicated generally by numeral 24, is disposed on a selected pair of opposed sidewalls. The pair of sidewalls selected is dependent upon whether the module will be mounted with the longer side or the shorter side in a horizontal position.

Clip 24, which is fabricated from any suitable resilient material, such as spring steel, has a central bar 26 defining its horizontal dimension that is substantially equal to the space between the pair of slots 20 in each wall. Extending rearwardly from bar 26 is a pair of spaced, trailing sections, each of which consists of upwardly sloping section 28, downward sloping section 30, elbow 32 and curved, lower section 34 that extends from elbow 32 toward bar 26 until it terminates at a point near the apex formed by sections 28 and 30. Bight 36 is formed in lower section 34 so that clip means 24 can be secured to the housing by snapping bights 36 beneath a pair of tangs 22. The oppositely sloping arms 28 and 30 provide resiliency for the central bar 26 which extends between the ends of arms 28.

As is illustrated in FIG. 1, a flange plate 38 which is detachably mounted to the one of the longer sidewalls 12 of the housing, has a top lip 40 that is engaged against the front surface of a panel when the module is mounted therein, and a pair of side edge legs 42 and 44. The lip 40 and legs 42 and 44 are bent perpendicularly from the flange plate 38 with the legs 42 and 44 having a dimension about one-half that of lip 40 whereby such legs 42 and 44 assist in properly seating clip 24 on the flange 38.

Flange 38 has a pair of spaced notches 46 and 48 along its bottom edge and a pair of perpendicularly bent tabs 50 and 52 that are disposed between the notches 46 and 48 and that extend a short distance behind the face of flange 38, in the direction opposite to lip 40. The spacing between the notches 46 and 48 in flange 38 corresponds to the spacing between the pair of tangs 22 in the sidewalls 10 and 12 of the housing, and the spacing between tabs 50 and 52 corresponds to the distance between the slots 20 in the walls 10 and 12. The length of tabs 50 and 52 also corresponds to the length dimension of slots 20.

FIG. 2 illustrates the manner in which clip 24 and flange 38 are joined to the housing to form a mounting arrangement prior to the flange-mounting of the module within a suitable panel cutout. Clip 24 is secured within a pair of slots 20 by engaging bights 36 under locking tangs 22 so that the central bar 26 is seated proximate the upper lip of the sidewall. Flange 38 is then slid downward between clip 24 and the exterior of the sidewall with the tabs 50 and 52 engaging the sidewall and causing the central bar 26 to be moved against the inherent bias of the clip 24 until tabs 50 and 52 are seated in slots 20, thereby aligning flange 38 with the housing. The notches 46 and 48 allow this downward movement of flange 38 without contacting clip 24, and displacing same from tangs 22. The same sequence of assembly is repeated to seat the clip 24 and flange 38 on the opposed sidewalls.

With the mounting arrangement of FIG. 1, assembled and secured to the module housing as shown in FIG. 2, then the housing is flange-mounted in a panel cutout as shown in FIG. 3. The module is simply pressed rearwardly into the panel 54 so that sections 28 and 30 of clip 24 are cammed downwardly for a moment and then resiliently return to normal condition when lip 40 abuts against panel 54. The slope of section 28 maintains the module in proper alignment within the panel.

FIG. 4 shows a modified resilient clip and a barrier to enable modules to be gang-mounted after the resilient clip has been secured to the slots in the housing. The module housing, which is standardized in all embodiments of the mounting arrangement, is the same as that shown in FIG. 1. The resilient clip, indicated generally by reference numeral 56, has been somewhat modified so as to be secured beneath tangs 22 and also seated within a barrier disposed between adjacent housings.

The clip 56 has a central, horizontal bar 58 and a pair of trailing sections extending rearwardly therefrom; each trailing section includes a vertical leg 60 perpendicularly joined to bar 58 and an upwardly sloping arm 62 which joins a central bight 64 leading to an extremity 66 that defines the rearmost extent of the clip. The width of clips 56 is substantially equal to the spacing between slots 20, so that bights 64 are flexed thereunder when the clip is secured to each wall of the pair of walls, selected in accordance with the orientation of the gang-mounted modules.

A barrier, indicated generally by reference numeral 68, has a panel lip 70 with a length equal to the length of the wall 10 or 12 upon which the resilient clip and barrier will be seated. In the embodiment of FIG. 4, the length of lip 70 is equal to the length of the longer walls 12 of the module housing. A body portion 72 extends rearwardly from lip 70 for a distance substantially equal to the depth of the module housing, as is shown in FIG. 5. Surrounding body 72 and joined thereto at its rearmost part is a generally U-shaped resilient clamp 74 having a pair of deformed arms 76 situated adjacent the lip 70. The U-shaped clamp 74 encloses the edges of the barrier 68 and provides a resilient mount for securing the barrier 68 within the panel 54 for gang mounting a plurality of modules.

The body 72 has a pair of spaced through channels 78 and 80 and a pair of spaced grooves 82 and 84 that intersect the channels to form a grid to seat the resilient clips 56 therein. The dimension of channels 78 and 80 is substantially equal to the dimension of central bar section 58 of the clip 56, and grooves 82 and 84 are sufficiently long to accommodate the trailing sections of clip 56 therein. As is illustrated in FIG. 7, the channel 78 (and 80) tapers inwardly from each sidewall of barrier body 72 to the midpoint thereof; thus, the midpoint is smaller in dimension than the diameter of clip bar 58 so as to clamp the barrier 68 against the housing sidewall 10 or 12. At each of the four corners defining the intersections between the two channels 78 and 80, and the two grooves 82 and 84, the dimension of each channel is enlarged circularly as shown by the bore 79 in FIG. 6 to permit passage of the clip arm 60 therethrough.

The method of gang-mounting the modules with the clip 56 and barrier 68 into the assembly of a panel cutout is shown in FIGS. 5–7. A pair of clips 56 is mounted on opposing sidewalls 10 or 12 by flexing bights 64 beneath locking tangs 22 so that bar 58 is positioned in proximity to the upper lip of the sidewall. On the adjacent module housing, bights 64 are flexed under tangs 22 so that the bar 58 of the clip 56 is positioned proximate to the rear of the module housing. This procedure of alternate orientation for the clip 56 is repeated for all of the module housings in ganged assembly.

Then barriers 68 with lips 70 extending forwardly, are pressed into clip means 56 with bars 58 proximate to the upper lip of the housing so that vertical legs 60 extend through channel bores 79 and the rearwardly extending portions of the clip are seated in grooves 82 and 84 in one face of body 72. To secure the next module, the clip 58 is alternately arranged with bar 58 extending rearwardly by seating bar 58 on one side of barrier body 72 in the rear channel 80 and sections 62, 64 and 66 in channels 82 and 84 respectively formed in the opposite face of body 72. In this manner, barrier 68 has a pair of clips 56 seated therein in staggered relationship, as shown in the cut away section of FIG. 5.

With the modules in gang-mounted relationship, the assembly is then inserted into a cutout in the panel 54 with a pushing motion until the rear surface of lip 70 abuts against the front surface of panel 54. The pushing motion causes arms 76 on the barrier clamp 74 to flex inwardly, and then spring outwardly and retain the barrier and associated module housings in aligned position within the panel, as seen in FIG. 6.

The barrier 68 shown in FIG. 4 may also be used with the flange mount of FIG. 1 to define a combined flange barrier mounting for module housings. For instance, the flange mounting of FIG. 1 is used to mount the housing in the panel 54 as shown in FIG. 3 with the clip 24 and flange 38 being disposed on each long wall 12. A barrier 68 with its clamp 74 is then disposed on each short wall 10 to retain the barrier lip 70 against the panel 54 in the same manner as illustrated in FIG. 6. The same arrrangement may be applied to a gang mount where a plurality of module housings are each attached to the panel 54 with the clip 24 and flange 38 on each long wall 12; a barrier 68 with its clamp 74 is then inserted between adjacent the short walls 10 of adjacently mounted housings. In both of these single and gang mount arrangements, the barrier 68 is not physically attached to the short housing walls 10 but is merely retained by means of the clamp arms 76 engaging the back of the panel 54.

In another combined flange barrier mounting for module housings, the barrier 68 is physically attached to the short housing walls 10. In this instance, the flange mounting of FIG. 1 is used on each long wall 12 to attach the module housing to the panel 54; a barrier 68 and its clip 56 is then disposed on each short wall 10 whereby the clip 56 merely retains the barrier body 72 against the respective short wall 10. When applied to a gang mount, a plurality of housing long walls 12 are attached to the panel 54, and the barrier 68 with its clip 56 is attached to only one of adjacent short walls 10 of adjacently mounted housings.

The embodiment of FIGS. 8 and 9 shows the present invention applied to conventional module housings that are manufactured with flanges joined to all four walls. Such modules have previously discussed sizes of panel cutouts, and then a mounting sleeve would be engaged over the portions of the housing extending behind the panel by sliding the sleeve over the housing from behind the panel. Then, the mounting sleeve and the module housing would be secured together by tightening two captive screws within the module housing to draw the mounting sleeve snugly against the back surface of the panel. Since module housings of this type are so widely used, it would be economically feasible to apply the present invention thereto by adapting them for front-mounting arrangements by using resilient clips.

As is shown in FIGS. 8 and 9, a pair of slots 20 is struck from each sidewall 10 and 12 of the rectangular module housing so that a locking tang 22 is formed in each slot; in this instance, the locking tangs 22 protrude toward the side edge of each sidewall rather than toward the center as shown in FIGS. 1 and 5. A clip 86 has a central looped bar 88 extending from a pair of angular wings 90 that evert into a pair of inwardly sloping sections 92 which in turn are straightened and formed with a pair of bights 94 leading to rear extremities 96. Bights 94 are engaged under tangs 22 to secure clip means 86 in position on the selected pair of walls, as seen in the cut away sections of FIG. 8.

After the pair of clip means 86 is in position, the module is pushed into a cutout in panel 54 until the rear surface of sidewall flange 98 abuts against the front of panel 54. The pushing motion flexes wings 90 inwardly, and the resiliency of the wings 90 after the module is seated retains the module in position.

Inasmuch as the present invention is subject to many other modifications and various changes in details, it is intended that all matter contained in the foregoing description or shown on the accompanying drawing shall be interpreted as illustrative and not in a limiting sense.

What is claimed is:

1. A mounting arrangement for electrical modules comprising
    a housing having opposed side walls,
    a panel having opening means receiving said housing,
    slot means including a pair of spaced slots in each of said walls,
    locking tang means on each of said walls disposed adjacent each of said spaced slots, and
    means securing said housing to said panel including resilient clip means having bight portions spaced apart a distance substantially equal to the spacing between said slots, each bight portion extending into its adjacent slot and interlocking with the adjacent locking tang means.

2. The combination of claim 1 wherein said housing has four walls disposed at right angles to each other to form a rectangle, said slot means are formed in each of said four walls, said locking tang means comprises a locking tang in each of said slot means, and said securing means are selectively disposed on an opposing pair of said four walls.

3. The combination as recited in claim 1 wherein said housing has panel engaging flange means on said sidewalls and wherein said clip means includes a pair of wing members angularly extending from said pair of bight portions and resiliently retaining said flange means against said panel.

4. The combination as recited in claim 1 wherein said housing has flange mounting means on said opposing pair of walls and wherein said clip means includes a pair of oppositely sloping arms extending from each of said bight portions and a central bar connecting corresponding ends of said arms, said central bar resiliently retaining said flange mounting means against said panel.

5. The combination as recited in claim 4 wherein said flange mounting means comprises a flange plate exteriorly disposed on its corresponding wall, a flange lip on one edge of said plate engaging said panel, notch means on an opposite edge of said plate to define clearances for said bight portions, and alignment tabs on said plate extending into said slots.

6. The combination as recited in claim 1 wherein said securing means includes barrier means on said opposing pair of walls, said barrier means comprising a barrier plate having a panel engaging lip and clamp means resiliently retaining said lip against said panel.

7. The combination as recited in claim 6 wherein said barrier plate includes a pair of spaced channels on each side thereof, a pair of spaced grooves on each side transversely disposed to said pair of spaced channels and intersecting the same to define a substantially rectangular outline on each side of said barrier plate, means defining openings through said barrier plate at each intersecting point of said channels and grooves, and wherein said clip means includes a central bar having ends extending through a corresponding pair of said openings and rearwardly disposed trailing portions from each end of said bar, said bight portions being intermediately disposed in said trailing portions and being deformed opposite to said bar whereby said bar is disposed in one channel on one side of said barrier plate and said trailing portions are disposed in one pair of spaced grooves on the other side of said barrier plate.

8. The combination as recited in claim 7 wherein second clip means is oppositely mounted on said barrier plate with its central bar being disposed in the other channel on the other side of said barrier plate and its trailing portions being disposed in the other pair of spaced grooves on the said one side of said barrier plate whereby a second housing may be gang mounted to said barrier plate.

9. A mounting arrangement for modules of electrical devices comprising,
    a housing having four side walls arranged in opposing pairs,
    a panel having opening means receiving said housing,
    slot means in each of said side walls,
    locking tang means on each of said side walls disposed adjacent said slot means therein,
    flange mounting means disposed on each of one pair of opposing side walls,
    clip means having bight portions interlocking with said locking tang means and biasing portions biasing said flange mounting means in the panel opening means,
    barrier means for each of the other pair of opposing side walls,
    each of said barrier means including a lip portion disposed adjacent an outer surface of said panel and a body portion disposed adjacent its corresponding side wall, and
    means retaining each of said barrier means in position with its body portion adjacent the corresponding side wall.

10. The combination as recited in claim 9 wherein said retaining means comprises a resilient clip having bight means interlocking with said locking tang means and biasing means biasing the body portion of said barrier means against the corresponding side wall.

11. The combination as recited in claim 9 wherein said retaining means comprises clamping means carried by said barrier means and engaging an inner surface of said panel.

12. The combination as recited in claim 11 wherein said clamping means comprises a U-shaped clamp carried by the body portion of said barrier means and having spring arms biased against the inner surface of said panel to clamp the lip portion of said barrier means against the outer surface of said panel.

References Cited

UNITED STATES PATENTS

| | | | |
|---|---|---|---|
| 2,093,038 | 9/1937 | Douglas | 248—27 |
| 2,703,662 | 3/1955 | Meyer | 220—3.6 |
| 3,168,612 | 2/1965 | Sorenson | 174—57 |
| 3,211,402 | 10/1965 | Hayter et al. | 248—27 |

ROY D. FRAZIER, *Primary Examiner.*

J. FRANKLIN FROSS, *Assistant Examiner.*